United States Patent [19]
Chen et al.

[11] Patent Number: 6,055,078
[45] Date of Patent: Apr. 25, 2000

[54] REAL TIME WAVELENGTH MONITORING CIRCUIT

[75] Inventors: Yung Jui Chen, Ellicott City, Md.; Haifeng Li, Eatontown, N.J.; Shan Zhong, Baltimore, Md.

[73] Assignee: University of Maryland Baltimore County, Baltimore, Md.

[21] Appl. No.: 09/070,797

[22] Filed: May 1, 1998

[51] Int. Cl.[7] .................................................. H04J 14/02
[52] U.S. Cl. .................... 359/130; 359/110; 359/124; 359/187
[58] Field of Search ................................. 359/124, 130, 359/187, 110; 385/24

[56] References Cited

U.S. PATENT DOCUMENTS

4,942,568  7/1990  Khoe et al. ............................... 359/187

Primary Examiner—Kinfe-Michael Negash
Attorney, Agent, or Firm—Nath & Associates; Gary M. Nath; Gregory B. Kang

[57] ABSTRACT

A real time multi-channel wavelength monitoring circuit for monitoring Waveguide Division Multiplexing communications networks (WDM) is disclosed. The monitoring circuit monitors the full wavelength of an input signal by providing center offset inputs into a Phased Array Waveguide Grating (PAWG). By providing center offset inputs to a PAWG the passband crossover point can be changed optimizing a different dynamic range and wavelength resolution.

13 Claims, 12 Drawing Sheets

REAL TIME WAVELENGTH MONITORING CIRCUIT

FIELD OF THE INVENTION

The present invention relates to a real time wavelength monitoring circuit for monitoring signals in a Wavelength Division Multiplexing (WDM) communications network.

BACKGROUND OF THE INVENTION

In a Wavelength Division Multiplexing (WDM) communications network it is essential to monitor the wavelength of signals from different nodes within the network.

In the past optical spectral analyzers and multi-channel optical wavelength meters were used to monitor the wavelengths of various signals at nodes throughout the WDM communications network. However both optical spectral analyzers and multi-channel optical wavelength meters use mechanical scanning mechanisms which respond slowly to wavelength change and are expensive.

Phased Array Waveguide Gratings (PAWGs) which eliminate mechanical scanning mechanisms were then introduced to be used in wavelength monitoring circuits. These circuits utilize the passband cross-over property of the PAWG to monitor the wavelength of various signals at nodes throughout a WDM communications network. However, since there are two PAWG passband peaks inside each channel spacing and the crossover point is very difficult to control, the wavelength range is usually less than 50% of the signal channel spacing resulting in poor system performance.

SUMMARY OF THE INVENTION

The present invention is a real time multi-channel wavelength monitoring circuit based on a novel PAWG design having center offset wavelength inputs and based on the principle that a PAWG output cross-over point can be easily adjusted by designing different input channel spacings. Accordingly, a PAWG of the present invention has a first center wavelength offset input and a second center wavelength offset input which permits the wavelength spacing between the passband peaks to be controlled, and provides an easier control of the cross-over point. The present circuit is capable of fully using a passband width above a broadband background noise such that a controllable wavelength range is increased. With the present circuit it is possible to adjust the wavelength measurement resolution according to particular system requirements.

In a first embodiment of the present invention a multi-channel wavelength monitoring circuit for monitoring signals is disclosed comprising, an input means for receiving signals at a first center wavelength offset input and a second center wavelength offset input wherein each of said signals has an input signal wavelength; and a switching means for switching said input means to receive said signals between said first center wavelength offset input and said second center wavelength offset input whereby said switching means switches between said first and second wavelength offsets in order to monitor each input signal wavelength over an entire wavelength range.

The invention further comprises a Phased Array Waveguide Grating (PAWG) connected to said input means wherein connected to a first end of said PAWG is said first center wavelength offset input, and connected to a second side of said PAWG is said second center wavelength offset input.

The invention also comprises of a plurality of detectors connected to said PAWG and further comprises a plurality of amplifiers connected to said plurality of detectors. An A/D converter is also connected to said plurality of amplifiers wherein connected to said A/D converter is a control means for switching said switch means whereby said control means switches said switching means when an output is detected from said A/D converter and connected to said switching means is said control means.

In another embodiment of the present invention said first center wavelength offset satisfies the equation $$\lambda = \lambda_0 - (2n_s d\sin(\beta)/m)/2$$

and said second center wavelength offset satisfies the equation $$\lambda = \lambda_0 + (2n_s d\sin(\beta)/m)/2$$

where
$\lambda_0$ is the center wavelength; and
$2n_s d\sin(\beta)/m$ is the center wavelength offset
where
$n_s$ is the slab waveguide index;
d is the grating pitch;
$\beta$ is the incident angle; and
m is the grating order.

Yet another embodiment of the present invention further comprises a supply unit connected to said input means wherein said supply unit provides an input for said monitoring unit to process.

In a further embodiments said supply unit is either a tunable laser, a precision wavelength addressable laser, or a tunable diode laser.

In another embodiment of the present invention said switching means is connected to said supply unit and said switching means provides information to said supply unit.

BRIEF DESCRIPTION OF THE DRAWINGS

FIG. 2A is a graph of throughputs $A_i$, $B_i$, $C_i$ and $D_i$.

DESCRIPTION OF THE PREFERRED EMBODIMENTS

The following examples are illustrative of preferred embodiments of the invention and are not to be construed as limiting the invention thereto.

The present invention is now described with reference to the drawings in which like elements are denoted by like numerals throughout the several views. In particular with reference to FIG. 1, a full coverage multi-channel wavelength monitoring circuit 100 is depicted. A multiplexed input 110 is connected to a switch 120 which selectively connects multiplexed input 110 to one of four input ports 130, 140, 150 or 160, respectively labeled Ain, Bin, Cin and Din. A PAWG 170 is connected to input ports 130, 140, 150 and 160 and receives multiplexed input 110. PAWG 170 demultiplexes multiplexed input 110 into a plurality of demultiplexed outputs 180, which in turn are connected to a plurality of detectors 190. The outputs from detectors 190 are serially connected to corresponding ones of a plurality of amplifiers 200 for detecting and amplifying outputs 180, and the outputs from amplifiers 200 are all connected to an A/D converter 210 which receives the demultiplexed output 180 through detectors 190 and amplifiers 200. Connected to A/D converter 210 is a controller (or signal processor) 220. A signal from A/D converter 210 notifies controller 220 when a signal is detected. Controller 220 also is connected to and controls switch 120.

Figure 1:
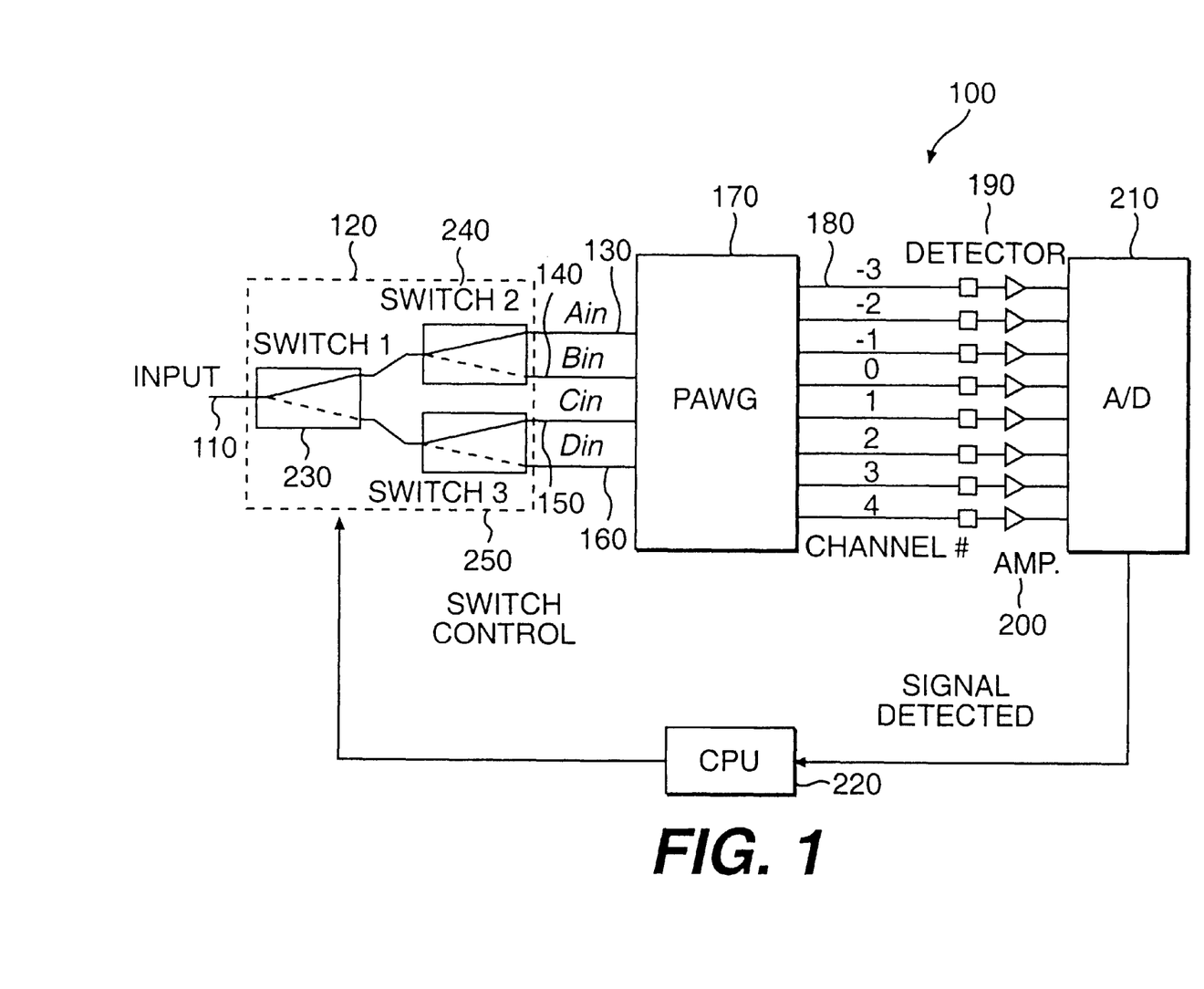
FIG. 1 is an electro-optic schematic block diagram illustrating an embodiment of a real time wavelength monitoring circuit in accordance with the present invention.

An 1×4 switch 120 is comprised of switches 230, 240 and 250. Switch 230 is connected to either switch 240 or 250 and is capable of switching between switches 240 and 250. Switch 240 is connected to input ports 130 and 140 and is capable of switching the input signal therebetween. Switch 250 is connected to input ports 150 and 160 and is capable of switching the input signal between input ports 150 and 160.

The circuit described above is a full coverage wavelength monitoring circuit of 4 wavelengths using a 4×8 center offset PAWG 170. PAWG 170 has 4 input ports 130, 140, 150 and 160 and 8 output ports 180. Each output port 180 has a different output center wavelength for each input port (130, 140, 150 and 160). Therefore by changing the input port from 130, 140, 150 and 160, each output port 180 will have a center wavelength that will shift a certain number of channel spacings to the longer wavelength direction. This is accomplished by shifting the center wavelength of the input ports (130, 140, 150 and 160) at a "center offset" angle. To expand to a monitoring system of n wavelengths, a 4×(n+4) PAWG will be used.

Figure 2:
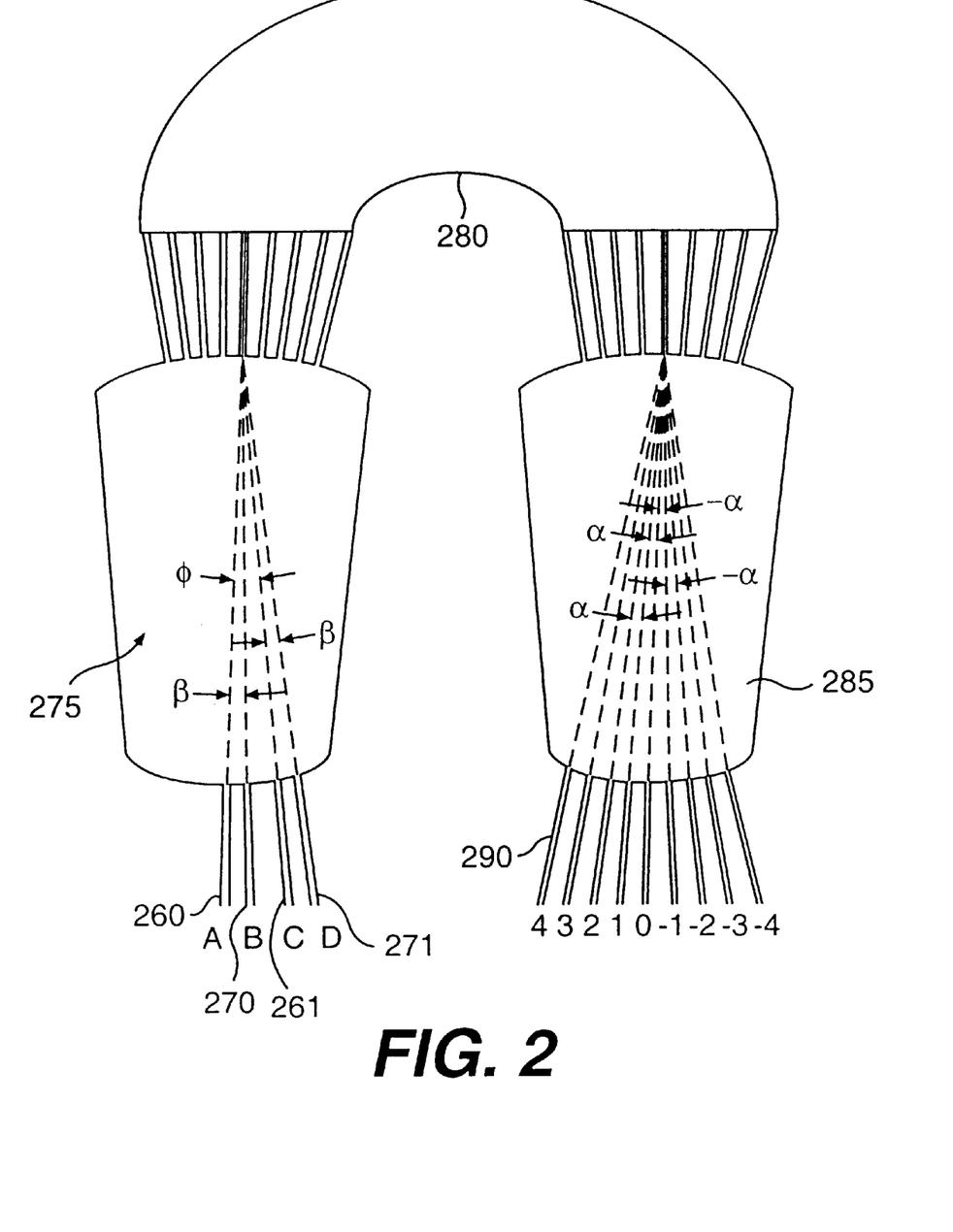
FIG. 2 is an optical schematic diagram of a PAWG having a center offset in accordance with the present invention.

With reference to FIG. 2 a center offset PAWG design is illustrated. A conventional 1×N PAWG utilizes a single input waveguide at a 0 degree incident angle and a set of output waveguides of constant angular spacing $\alpha$, corresponding to a wavelength spacing of $\Delta\lambda$. The present invention is similar to a 2×N PAWG in which a first input port 260 is connected to an input slab waveguide 275 at an incident angle of 0, and a second input port 270 is connected to input slab waveguide 275 at an incident angle $\beta$. The third input port 261 is connected to input slab waveguide 275 at an angle $\phi$ (in most cases $\phi=2.5\ \alpha$) from center, and the forth input port 271 is connected to slab waveguide 275 at an angle $\beta$ from the third input port 261. Thus the center wavelengths from the input ports 260, 270, 261 and 271 are:

$$\lambda_{0(260)}=\lambda_0^A=n_c\Delta L/m$$

$$\lambda_{0(270)}=\lambda_{-1}^B=\lambda_0^A+\delta\lambda$$

$$\lambda_{0(261)}=\lambda_{-2}^C=\lambda_0^A+\Delta\lambda/2$$

$$\lambda_{0(271)}=\lambda_{-3}^D=\lambda_0^A+\Delta\lambda/2+\delta\lambda$$

where $\lambda_0^A$ is the PAWG 0 to 0 center wavelength, and differs from the signal nominal center wavelength $\lambda_0$ by $-\delta\lambda/2$ and satisfies the equation $\lambda_0^A=\lambda_0-\delta\lambda/2$ $$\delta\lambda=n_s d(\beta-\alpha)/m$$

$$\Delta\lambda=n_s d\alpha/m$$

$$\lambda_0^A=\lambda_0-\delta\lambda/2$$

where $n_s$ is the slab waveguide index;

d is the grating pitch; and m is the grating order.

Input slab waveguide 275 and output slab waveguide 285 are connected to PAWG 280 at opposite ends of PAWG 280. Output ports 290 are connected to output slab waveguide 285. Each port of output ports 290 has a different output center wavelength according to the center wavelength with different input ports 260, 270, 261 and 271.

Figure 3A:
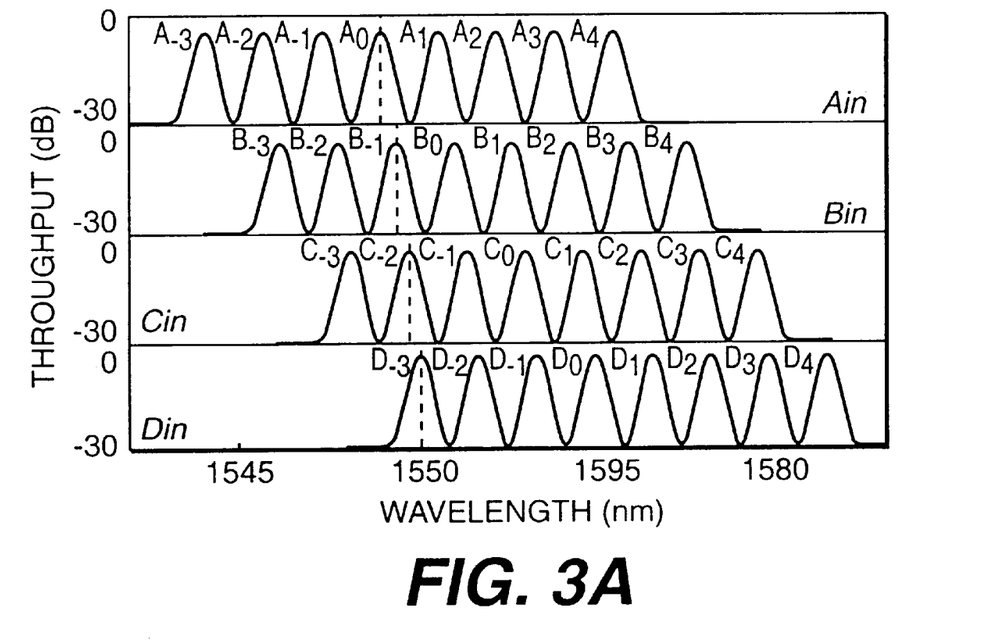
FIG. 3A is a graph of discrimination curves $A_i/B_{i-1}$ and $C_i/D_{i-1}$.
Figure 3B:
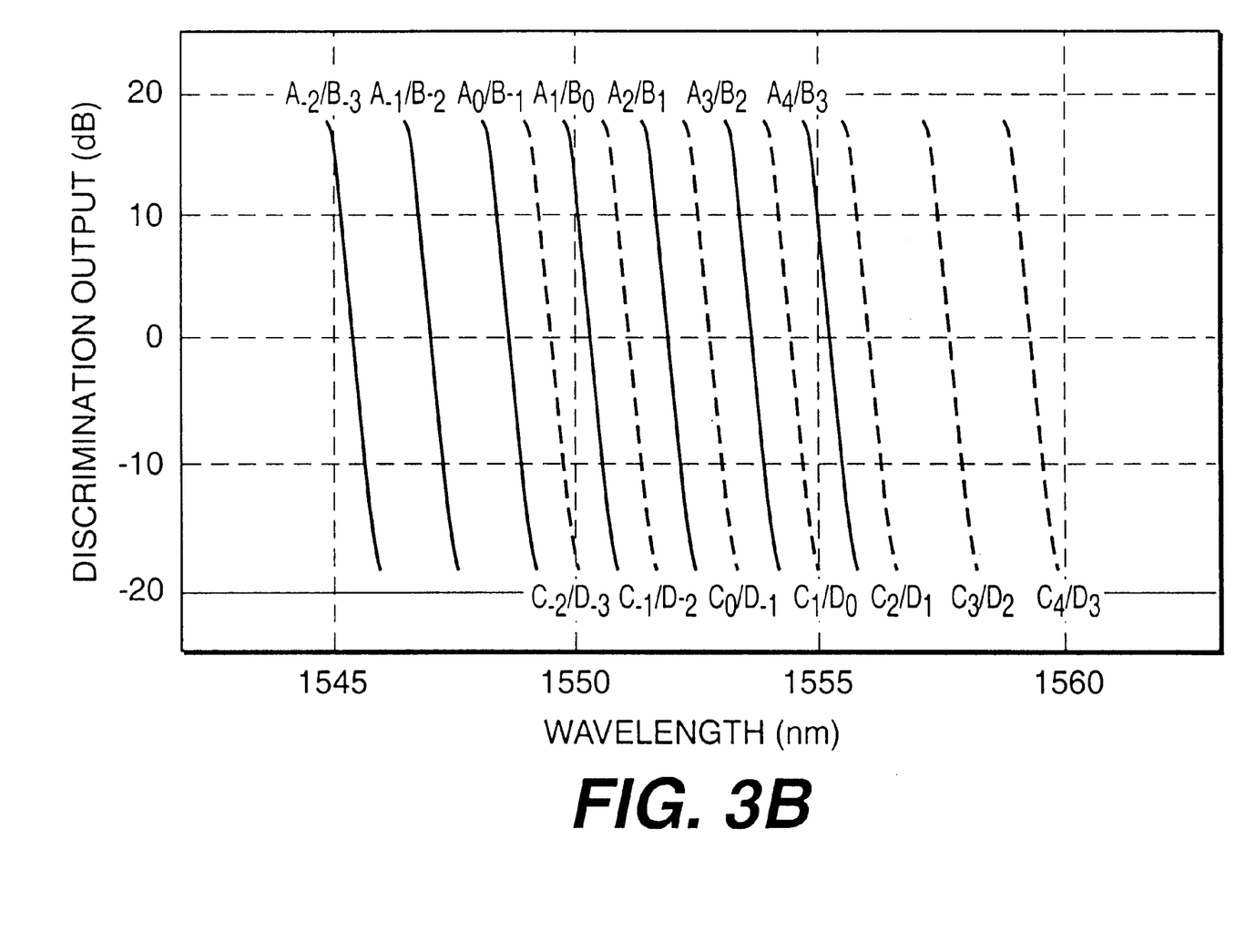

FIG. 3A shows the simulated transmission passbands $X_j$, for inputs received through input ports 260, 270, 261 and 271 (where X is used to represent an input signal from port 260, 270, 261 or 271, and j is used to represent an output port). The precise wavelengths are readily measured using the discrimination curves of the system extracted from the ratios between each pair of output signals $A_i$ and $B_{i-1}$. To illustrate the wavelength monitor function, the center signal wavelength $\lambda_0$ is used in the following example. If the signal wavelength is exactly at the designed wavelength, $A_0$ and $B_{-1}$ which are retrieved from output ports 0 and −1 at different times are nearly equal. Therefore signals with wavelengths departed from $\lambda_0$ will generate different output strengths $A_0$ and $B_{-1}$. The logarithm of $B_{-1}/A_0$ is nearly linearly proportional to the wavelength drift. With reference to FIG. 3B which shows the logarithm ratios between the output ports throughput for each pair of adjacent input channel, the exact wavelength can be readily determined from the figure.

In FIG. 3B, an output ratio $A_i/B_{i-1}$ is represented by a solid line where A and B are the input ports and i is the output port number, and an output ratio $C_i/D_{i-1}$ is represented by a dashed line where C and D are the input ports and i is the output port number. FIG. 3B illustrates that the ratio curve is precisely dependent on the input signal's wavelength and is nearly linear if the shape of the throughput is a Gaussian shape. Thus input signal's wavelength can be determined using the discrimination curves.

Because of the existence of crosstalk of about −25 dB to −30 dB for each PAWG, the useful ranges of these discrimination curves are limited. Based on the simulation result shown in FIG. 3B, the linear range for each discrimination curve is shortened dramatically to 75% of the channel spacing or less considering a −25 dB crosstalk. Thus if the input signals wavelength is located outside the linear range of these discrimination curves like $A_i/B_{i-1}$, the monitor will be blind and cannot give the correct wavelength.

However there is another group of discrimination curves of $C_i/D_{i-1}$, which is designed to be located in the middle of curves $A_i/B_{i-1}$ as a result of the special design of the center offset. With optical switches and fast switching between the two input pair of $A_{in}/B_{in}$ and $C_{in}/D_{in}$, the whole wavelength range is covered by these two series of discrimination curves. By using this new design, the passband crossover point can be changed and optimized to achieve a different dynamic range and wavelength resolution. If needed one can also use the ratios derived from $B_{in}/C_{in}$ and $D_{in}/A_{in}$ to further extend the dynamic range.

Figure 4:
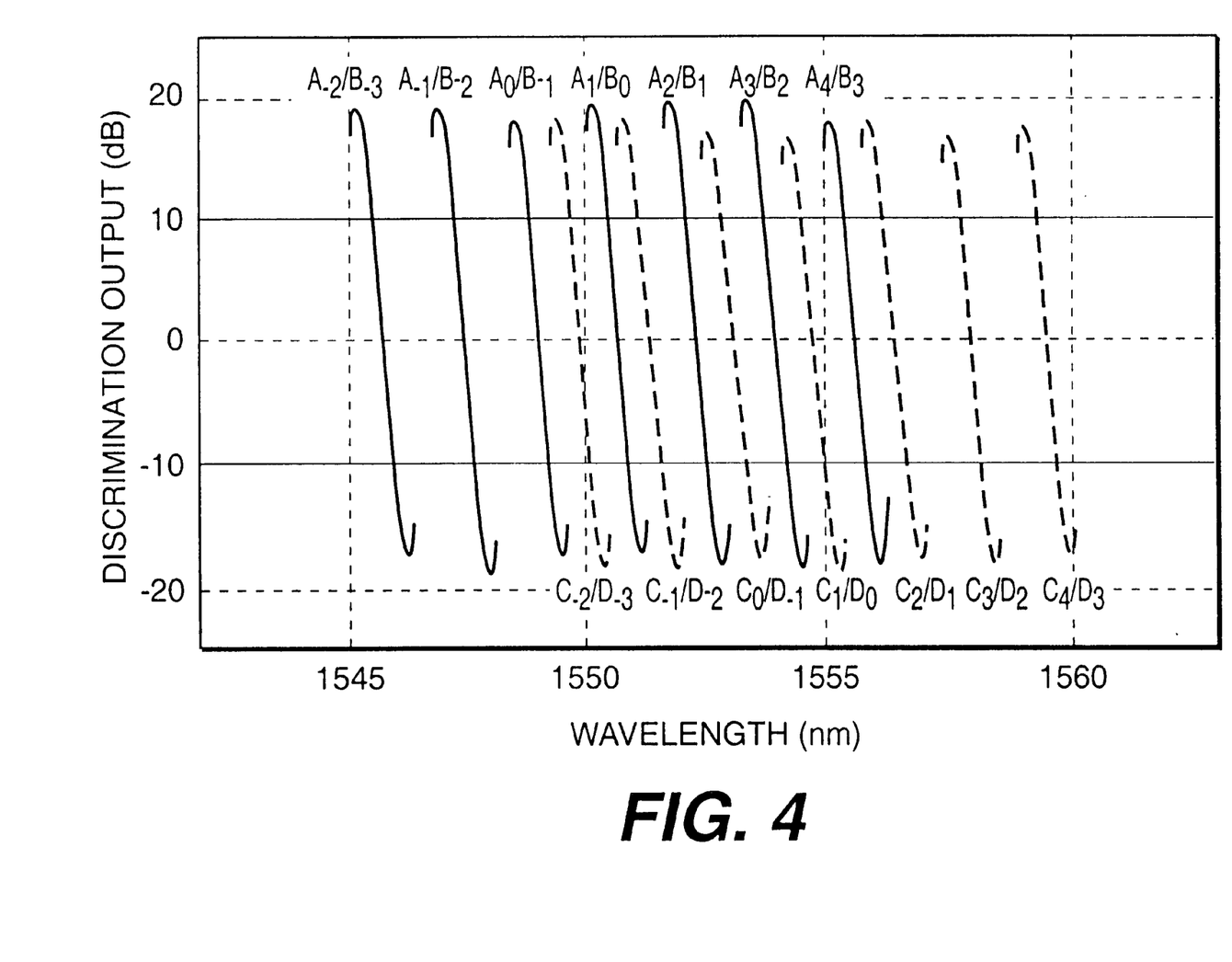
FIG. 4 is a graph of discrimination curves $A_i/B_{i-1}$ and $C_i/D_{i-1}$ wavelength channel spacings of 1.6 nm.

FIG. 4 illustrates measured throughputs and discrimination curves of the wavelength monitoring circuit depicted in FIG. 1 with wavelength channel spacings $\Delta\lambda=1.6$ nm (or $\Delta f=200$ Ghz in frequency domain) and $\delta\lambda=0.16$ nm. The circuit is made of silica on silicon substrate. In an experiment under constant temperature control, input laser wavelength shift was monitored with an accuracy of 0.02 nm/dB for a range of 0.9 nm with a monitoring wavelength range of about 8 nm. The wavelength monitoring operation was tested with both DC and 2.5 Gb/s modulated WDM signals. The technique is equally effective for DC as well as high frequency modulated signals.

Figure 5:
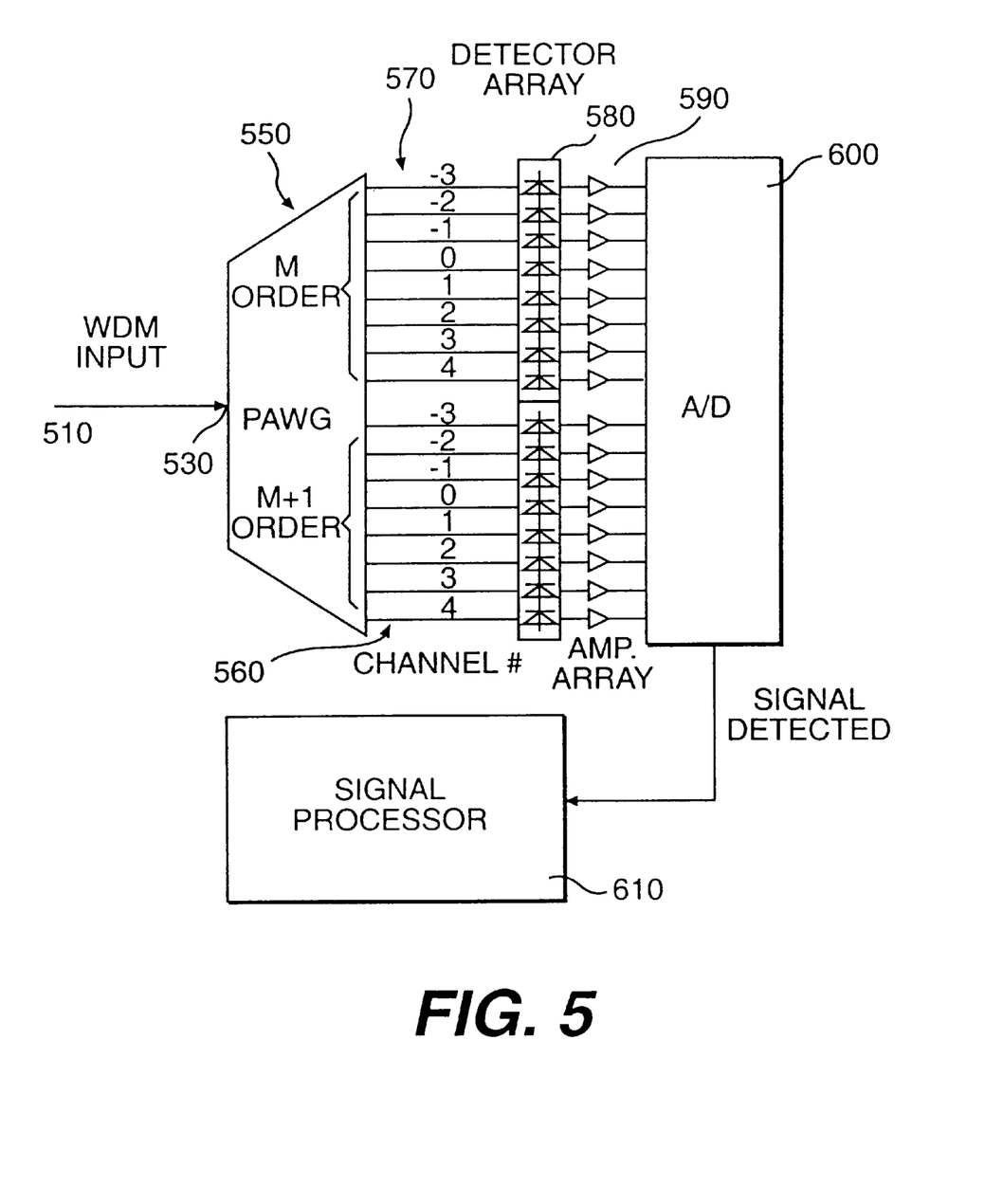
FIG. 5 is an electro-optic schematic block diagram illustrating an alternate embodiment of a real time wavelength monitoring circuit of the present invention producing m and m+1 order outputs.

FIG. 5 illustrates another embodiment of the present invention and depicts a two order output detecting wavelength/power monitoring circuit. An input 510 is connected to an input port 530. Input port 530 is connected to PAWG 550 which demultiplexes input 510 into two groups of outputs, an m+1 order output 560 and an m order output 570. The signals from both the m+1 order output 560 and m order output 570 are individually, serially connected to a plurality of corresponding detectors 580 and amplifiers 590. Amplifiers 590 are connected to a signal processor. The signal processor can be an analog discrimination circuit or the digital circuit in FIG. 5. In FIG. 5 amplifiers 590 are connected to an A/D converter 600. A processor 610 is connected to and receives input from A/D converter 600. As the outputs 560 and 570 are detected and amplified by detectors 580 and amplifiers 590, A/D converter 600 signals processor 610 that an output has been detected and processor 610 compares the corresponding 560 and 570 signals.

Figure 6:
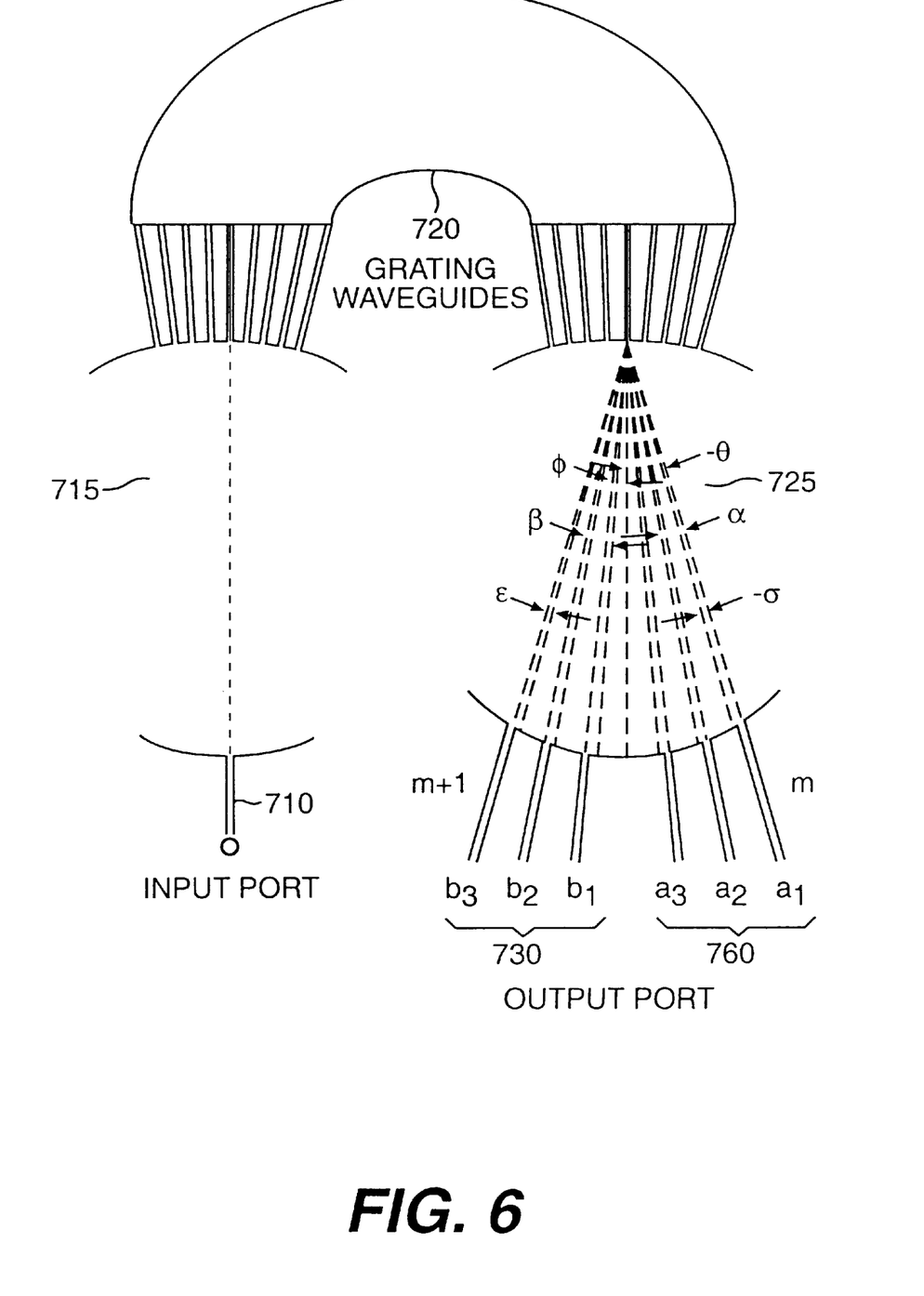
FIG. 6 is an optical schematic diagram of a PAWG having m and m+1 order outputs.

FIG. 6 illustrates the design of PAWG 550. Instead of having multiple input ports a single input port 710 is connected to input slab waveguide 715. Input slab waveguide 715 is connected to a grating waveguide 720 and an output slab waveguide 725 is connected to waveguide grating 720. PAWG 550 demultiplexes input signals received from input port 710 into m+1 order demultiplexed outputs 730 and m order demultiplexed outputs 740.

The m order output port $a_j$ wavelength is $$\lambda_j^a = (n_c\Delta L - n_s d\theta + n_s d(j-1)\alpha - n_s d\sigma)/m = \lambda_j - \delta\lambda$$

and the m+1 order output port $b_j$ wavelength is $$\lambda_j^b = (n_c\Delta L - n_s d\phi + n_s d(j-1)\beta - n_s d\epsilon)/(m+1) = \lambda_j + \delta\lambda$$

where $\lambda_j$ is the signal nominal wavelength for channel j and $\delta\lambda = n_s d\sigma/m = n_s d\epsilon/(m+1)$ is the wavelength offset. Here we have two output passbands with offset center wavelengths $\lambda_j^a$ and $\lambda_j^b$. The discrimination curve can be easily obtained by taking the ratio between the two signals as was described earlier in relation to FIG. 3A. The advantage of the two order design is it does not require the switch. All signals are collected and processed at real time. Analog circuits can be used to do the feedback control.

Figure 7:
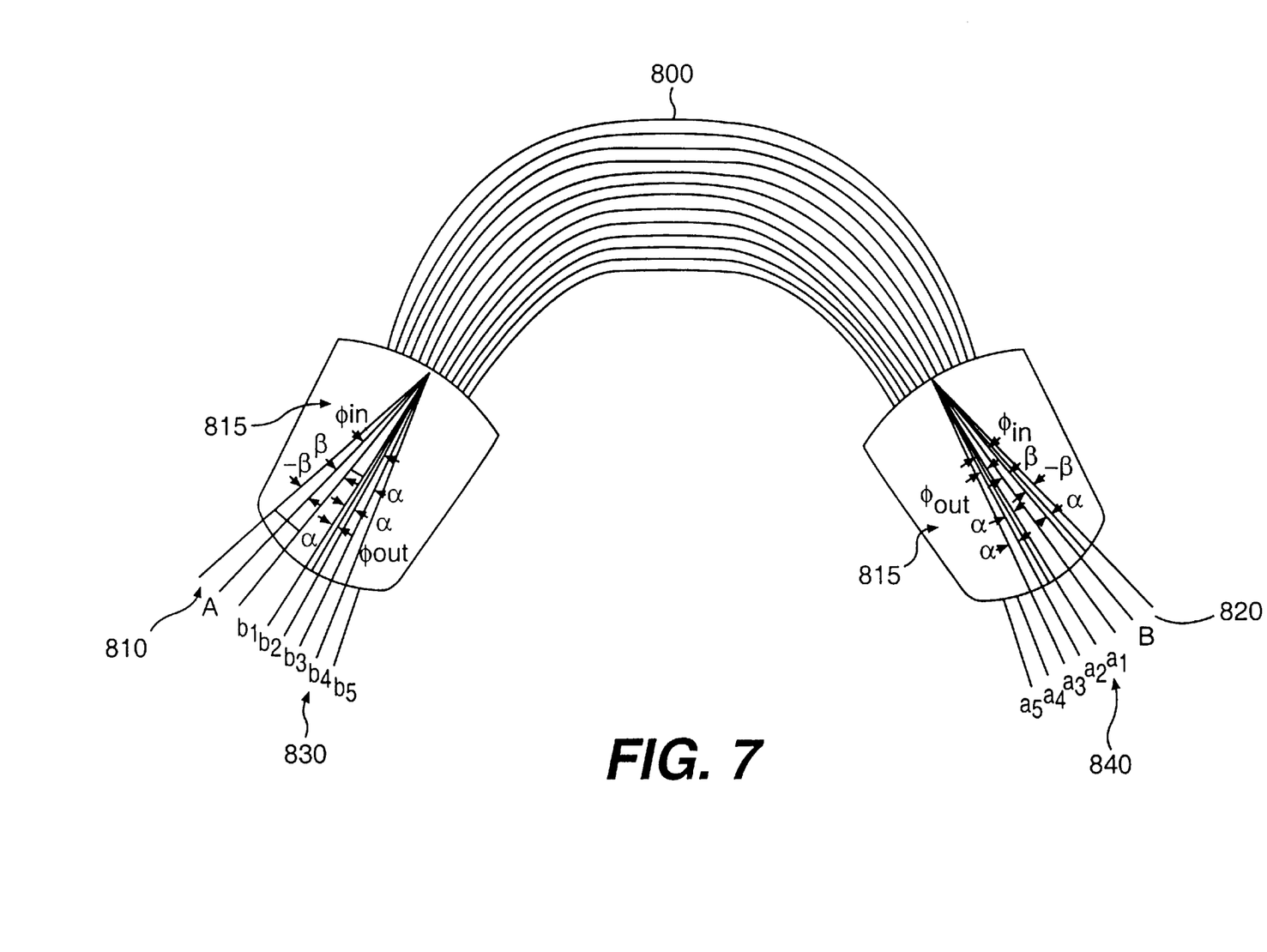
FIG. 7 is an optical schematic diagram of a PAWG having inputs at alternate ends.

FIG. 7 illustrates another embodiment of the present invention which allows real time wavelength monitoring. In FIG. 7 a PAWG 800 is depicted and has a first input 810 located on slab waveguide 815, and second input 820 on the other slab waveguide 825. Slab waveguide 815 and 825 are connected to PAWG 800 at opposite ends of PAWG 800. A set of output waveguides 820 is connected to slab waveguide with angular spacings of α. A second set of output waveguides 830 are connected to slab waveguide 815 with angular spacing α. The wavelength connecting input A to output $a_1$ is $$\lambda_{a1}^A = (n_c\Delta L + n_s d(\theta_{in} - \sigma + \theta_{out}))/m = \lambda_0 - \delta\lambda$$

and the wavelength connecting input B to output $b_1$ is $$\lambda_{b1}^B = (n_c\Delta L + n_s d(\theta_{in} + \sigma + \theta_{out}))/m = \lambda_0 + \delta\lambda$$

where $\delta\lambda = n_s d\sigma/m$;
$\lambda_0 = (n_c\Delta L + n_s d(\theta_{in} + \theta_{out}))/m$;
$n_s$ is the slab waveguide index;
d is the grating pitch; and
m is the grating order.

Again, we have two output passbands with offset center wavelengths $\lambda_{aj}^A$ and $\lambda_{bj}^B$. The discrimination curve can be easily obtained by taking the ratio between the two.

The advantage of this design is as follows. First there is no coherent crosstalk since the signals are input from opposite directions. Second it operates in real time without the use of optical switches. Finally since only one PAWG is used there is no center wavelength shift due to PAWG processing.

Figure 8:
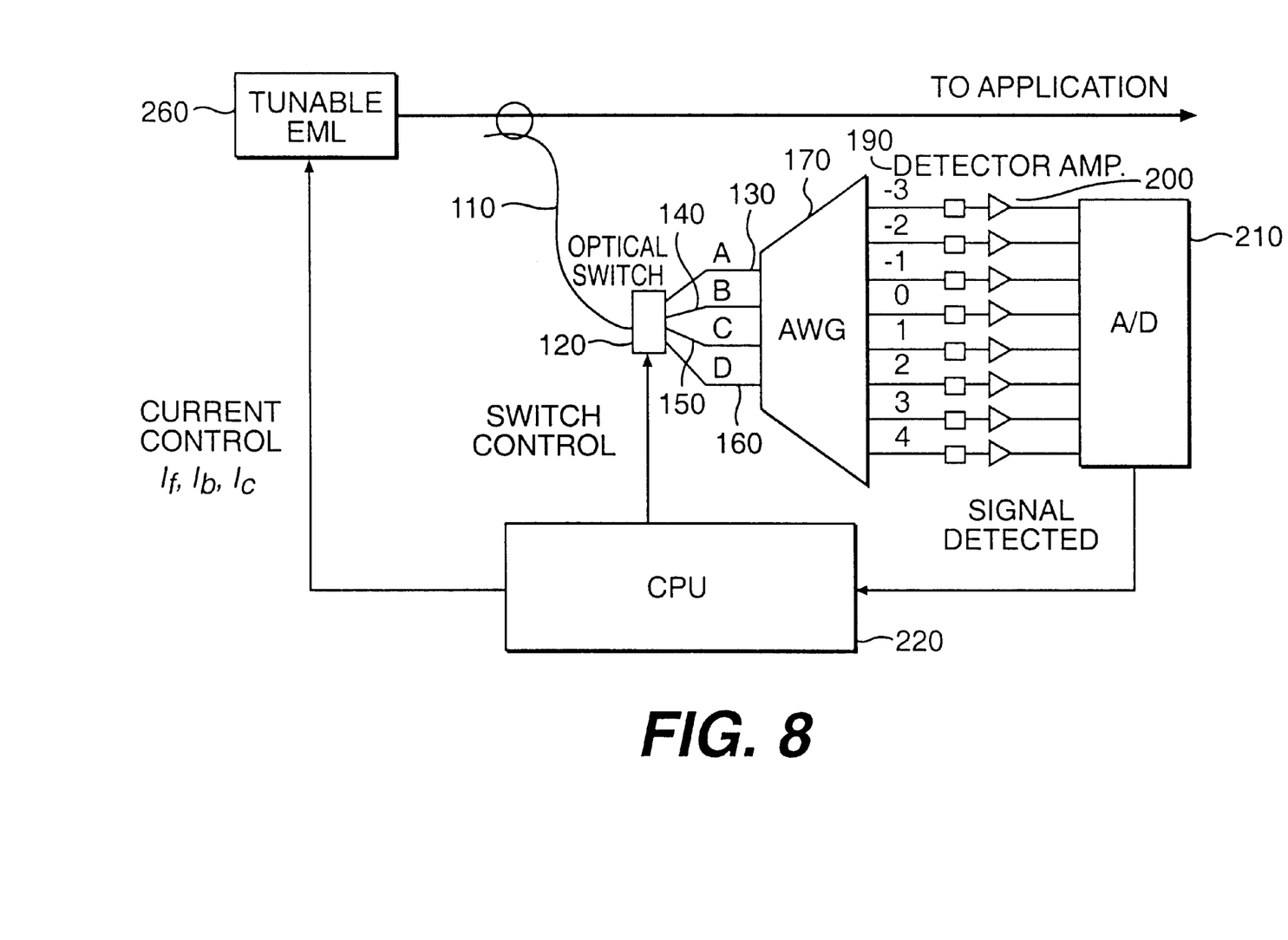
FIG. 8 is an electro-optic schematic diagram of a real time wavelength monitoring circuit connected to a tunable laser.

FIG. 8 illustrates another embodiment of the present invention wherein a real time wavelength monitoring circuit as depicted in FIG. 1 is connected to a supply unit 260. Supply unit 260 can be a tunable laser, a tunable diode laser, a precision wavelength addressable laser, a Electroabsorbtion Modulated Laser (EML), or any other type of input source. Supply unit 260 is connected to input 110 and provides a multiplexed input signal at a particular wavelength. CPU 220 is also connected to supply unit 260 and provides information to supply unit 260 based on the discrimination curves as discussed earlier in relation to FIGS. 3B and 4, and the output curves as discussed in relation to FIG. 3A.

Figure 9:
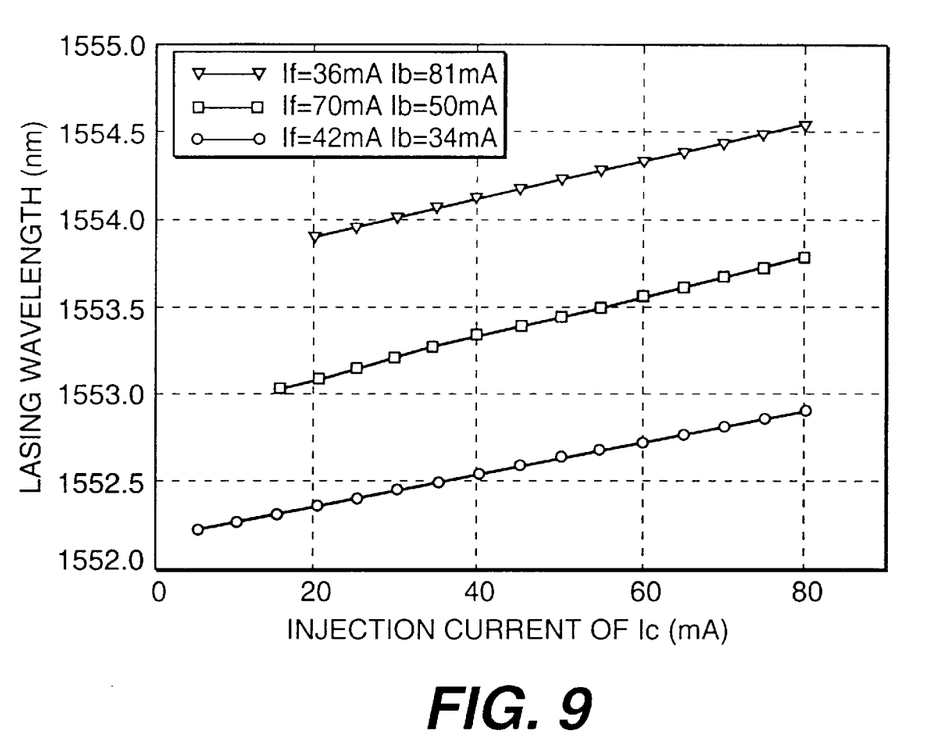
FIG. 9 is a graph of current characteristics of a tunable laser.

An experiment was conducted using a tunable laser having a central current injection electrode, $I_c$, and two side current injection electrodes $I_b$ and $I_f$. The tunable laser used in this experiment was an Electroabsorption Modulated Laser (EML) device integrated with a bent waveguide DFB laser. FIG. 9 illustrates the current conditions and tuning characteristics of the tunable laser. Electrode $I_c$ was used to fine tune the lasing wavelength while the two side electrodes $I_c$ and $I_f$ were used to set the lasing wavelength to the ITU wavelengths at the center of each tuning curve. A total tuning range of 2.7 nm was observed and the wavelength tuning efficiency of $I_c$ was about 0.01 nm/mA.

Figure 10:
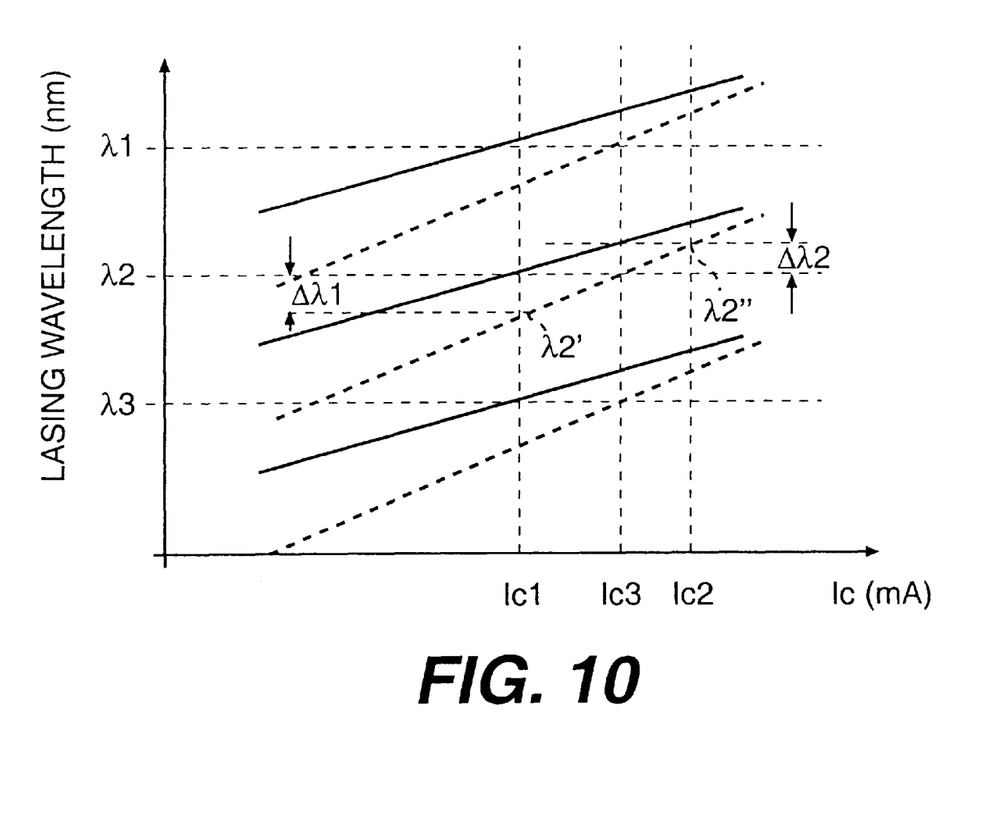
FIG. 10 is a graph of calibration curves for multiple wavelengths.

To set the laser to an addressed ITU wavelength, $\lambda_2$, currents $I_f$ and $I_b$ were set to the "best guessed" values as determined by the calibration curves illustrated in FIG. 10. The lasing wavelength, $\lambda_2'$, was then measured by the monitoring circuit. Based on the wavelength difference $\Delta\lambda_1 = \lambda_2 - \lambda_2'$, a modified current $I_c$ is determined and applied to the laser. The system is self-learning while making changes so that the tuning curve is constantly updated.

Figure 11:
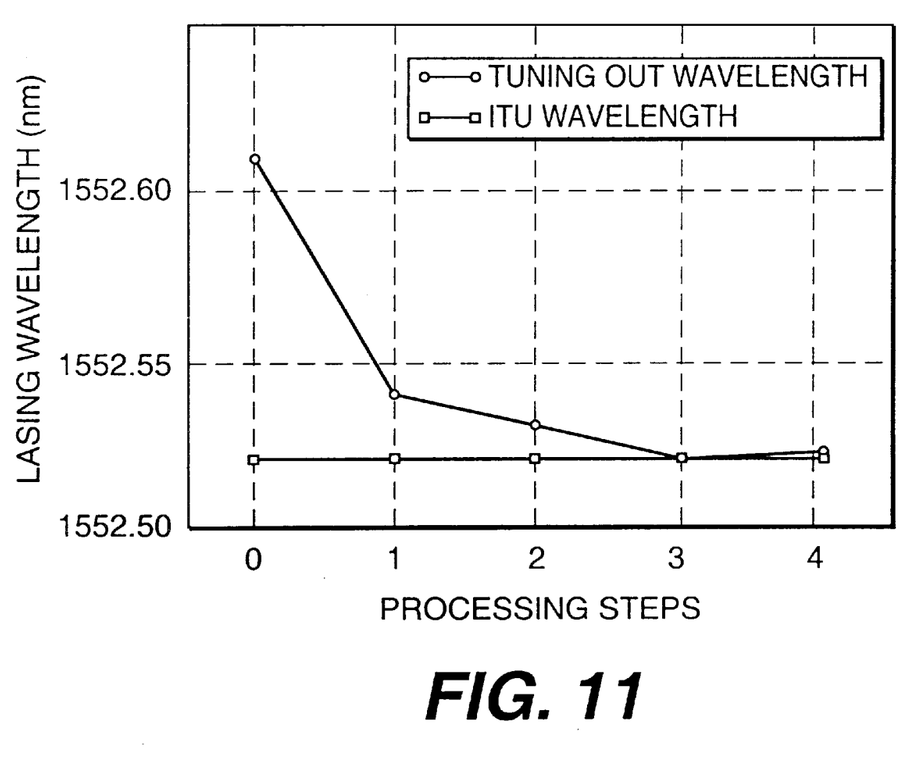
FIG. 11 is a graph of experimental data measuring the real output wavelength and the desired wavelength.

FIG. 11 shows the experiment data of real output lasing wavelengths and desired wavelength in a tuning process. It was found that only three tries were needed for most cases and the tuning accuracy was found to be better than 0.01 nm.

An addressable WDM laser using a 4X8 PAWG wavelength monitoring circuit has been demonstrated. The tuning control is based on a planar lightwave circuit which is self-contained, self learning and able to adapt to changes in the device and/or environment. This design is an attractive light source for reconfigurable WDM systems because of its rapid and accurate wavelength tuning characteristics.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A multi-channel wavelength monitoring circuit for monitoring signals comprising;
   an input means for receiving signals at a first center wavelength offset input and a second center wavelength offset input wherein each of said signals has an input signal wavelength;

a Phased Array Waveguide Grating (PAWG) connected to said input means; and a switching means for switching said input means to receive said signals between said first center wavelength offset input and said second center wavelength offset input whereby said switching means switches between said first and second wavelength offsets in order to monitor each input signal wavelength over an entire wavelength range.

2. A multi-channel wavelength monitoring circuit as claimed in claim 1 wherein connected to a first end of said PAWG is said first center wavelength offset input, and connected to a second side of said PAWG is said second center wavelength offset input.

3. A multi-channel wavelength monitoring circuit as claimed in claim 1 and further comprising a plurality of detectors connected to said PAWG.

4. A multi-channel wavelength monitoring circuit as claimed in claim 3 and further comprising a plurality of amplifiers connected to said plurality of detectors.

5. A multi-channel wavelength monitoring circuit as claimed in claim 4 and further comprising an A/D converter connected to said plurality of amplifiers.

6. A multi-channel wavelength monitoring circuit as claimed in claim 5 wherein connected to said A/D converter is a control means for switching said switch means whereby said control means switches said switching means when an output is detected from said A/D converter.

7. A multi-channel wavelength monitoring circuit as claimed in claim 5 wherein connected to said switching means is said control means.

8. A multi-channel wavelength monitoring circuit as claimed in claim 1 wherein said first center wavelength offset satisfies the equation $$\lambda = \lambda_0 - (2n_s d \sin(\beta)/m)/2$$

and said second center wavelength offset satisfies the equation $$\lambda = \lambda_0 + (2n_s d \sin(\beta)/m)/2$$

where $\lambda_0$ is the center wavelength; and $2n_s d\sin(\beta)/m$ is the center wavelength offset where $n_s$ is the slab waveguide index;

d is the grating pitch;

$\beta$ is the incident angle; and m is the grating order.

9. A multi-channel wavelength monitoring circuit as claimed in claim 1 further comprising a supply unit connected to said input means wherein said supply unit provides an input for said monitoring unit to process.

10. A multi-channel wavelength monitoring circuit as claimed in claim 9 wherein said supply unit is a tunable laser.

11. A multi-channel wavelength monitoring circuit as claimed in claim 9 wherein said supply unit is a precision wavelength addressable laser.

12. A multi-channel wavelength monitoring circuit as claimed in claim 9 wherein said supply unit is a tunable diode laser.

13. A multi-channel wavelength monitoring circuit as claimed in claim 9 wherein said switching means is connected to said supply unit and said switching means provides information to said supply unit.

* * * * *

UNITED STATES PATENT AND TRADEMARK OFFICE
CERTIFICATE OF CORRECTION

PATENT NO. : 6,055,078
DATED : April 25, 2000
INVENTOR(S) : Yung Jui CHEN et al.

It is certified that error appears in the above-identified patent and that said Letters Patent is hereby corrected as shown below:

Claim 7, line 2
change "5" to --6--

Signed and Sealed this

Tenth Day of April, 2001

Attest:

NICHOLAS P. GODICI

Attesting Officer     Acting Director of the United States Patent and Trademark Office